(12) United States Patent
Raghava et al.

(10) Patent No.: US 11,789,883 B2
(45) Date of Patent: Oct. 17, 2023

(54) INTER-DIE COMMUNICATION OF PROGRAMMABLE LOGIC DEVICES

(71) Applicant: Intel Corporation, Santa Clara, CA (US)

(72) Inventors: Sharath Raghava, Los Gatos, CA (US); Dheeraj Subbareddy, Portland, OR (US); Kavitha Prasad, San Jose, CA (US); Ankireddy Nalamalpu, Portland, OR (US); Harsha Gupta, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 777 days.

(21) Appl. No.: 16/103,709

(22) Filed: Aug. 14, 2018

(65) Prior Publication Data
US 2019/0050361 A1    Feb. 14, 2019

(51) Int. Cl.
*G06F 13/40*    (2006.01)
*G06F 13/42*    (2006.01)

(52) U.S. Cl.
CPC ...... *G06F 13/4027* (2013.01); *G06F 13/4282* (2013.01)

(58) Field of Classification Search
CPC .................. G06F 13/4027; G06F 13/4282
See application file for complete search history.

(56) References Cited

U.S. PATENT DOCUMENTS

| | | | |
|---|---|---|---|
| 6,757,759 B1* | 6/2004 | Jones | G06F 13/26 710/100 |
| 8,819,616 B2* | 8/2014 | Philip | G06F 15/76 710/316 |
| 10,409,626 B1* | 9/2019 | Chen | G06F 13/4221 |
| 2004/0037292 A1* | 2/2004 | Gulati | G06F 13/4247 370/395.5 |
| 2007/0143578 A1* | 6/2007 | Horton | H04L 49/35 712/11 |
| 2008/0244126 A1* | 10/2008 | Hundley | G06F 9/4843 710/104 |
| 2008/0244150 A1* | 10/2008 | Sharma | G06F 13/4282 710/316 |
| 2012/0147567 A1* | 6/2012 | Lee | H01L 25/0655 361/729 |
| 2013/0336334 A1* | 12/2013 | Gilbert | G06F 13/4265 370/458 |
| 2014/0365703 A1 | 12/2014 | Yamaguchi et al. | |
| 2015/0106560 A1* | 4/2015 | Perego | G06F 12/10 711/105 |
| 2015/0109024 A1 | 4/2015 | Abdelfattah et al. | |
| 2015/0248371 A1* | 9/2015 | Zheng | G06F 15/7825 710/315 |

(Continued)

OTHER PUBLICATIONS

Extended European Search Report for EP19182454.9 dated Nov. 25, 2019, pp. 1-8.

*Primary Examiner* — Henry Tsai
*Assistant Examiner* — Harry Z Wang
(74) *Attorney, Agent, or Firm* — Fletcher Yoder, P.C.

(57) ABSTRACT

An integrated circuit device may include a first network on chip (NOC) circuit configured to receive a set of data and transfer the set of data to a first node of the first NOC circuitry. The first node is configured to transfer the set of data to a second NOC circuit of an additional integrated circuit device separate from the integrated circuit device.

20 Claims, 8 Drawing Sheets

(56) References Cited

U.S. PATENT DOCUMENTS

| | | | |
|---|---|---|---|
| 2015/0269074 A1* | 9/2015 | Shah | G06F 13/28 |
| | | | 711/130 |
| 2016/0154760 A9* | 6/2016 | Davis | G06F 9/44505 |
| | | | 710/104 |
| 2016/0163609 A1* | 6/2016 | Rahman | G01R 31/2856 |
| | | | 324/762.03 |
| 2016/0321094 A1* | 11/2016 | Rabi | G06F 13/4022 |
| 2017/0170153 A1* | 6/2017 | Khare | H01L 23/5386 |
| 2017/0177263 A1* | 6/2017 | Das | G06F 13/382 |
| 2017/0220508 A1* | 8/2017 | Kaviani | G06F 13/4022 |
| 2017/0228481 A1* | 8/2017 | Pusuluri | G06F 30/394 |
| 2018/0004581 A1* | 1/2018 | Brown | G06F 9/542 |
| 2019/0004842 A1* | 1/2019 | Jiang | G06F 9/226 |
| 2019/0180170 A1* | 6/2019 | Huang | G06F 15/80 |
| 2019/0363717 A1* | 11/2019 | Swarbrick | G06F 21/76 |

* cited by examiner

INTER-DIE COMMUNICATION OF PROGRAMMABLE LOGIC DEVICES

BACKGROUND

The present disclosure relates generally to data communication between several integrated circuit devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Programmable logic devices, a class of integrated circuits, may be programmed to perform a wide variety of operations. In some applications, several programmable logic devices may be communicatively coupled to one another, and the programmable logic devices may perform one or more operations by communicating data between one another. The amount of time it takes for data to be communicated between points on the programmable logic devices, which is known as latency, may be slower than desired for a given operation performed by the programmable logic devices. For instance, the data may traverse several portions of one or more programmable logic devices, including programmable logic devices that are not the source or destination of the data, which may cause the latency associated with the data to be undesirably high.

SUMMARY

Certain aspects commensurate in scope with the originally claimed disclosure are set forth below. It should be understood that these aspects are presented merely to provide the reader with a brief summary of certain forms of the disclosure might take and that these aspects are not intended to limit the scope of the disclosure. Indeed, the disclosure may encompass a variety of aspects that may not be set forth below.

To provide high bandwidth, low latency communication between multiple integrated circuit devices (e.g., programmable logic devices), networks-on-chips (NOCs) of the integrated circuit devices may be utilized. For example, data may be processed by a portion of one integrated circuit device, transferred to a node (e.g., a router) of the NOC of the integrated circuit device, and transmitted to a node of another NOC of another integrated circuit device (e.g., via a communication pathway provided by a die, package substrate, or circuit board). The node of the other integrated circuit device may route the data to a particular portion of the integrated circuit device for further processing.

Furthermore, a communication packet that includes information related to the data to be transmitted may be utilized to facilitate communication between the integrated circuits. For instance, the communication packet may include information regarding a source of the data being sent (e.g., a portion of an integrated circuit device), a destination regarding where the data is being sent (e.g., a portion of another integrated circuit device), and information regarding a pathway for the data (e.g., through which nodes of the NOCs of the integrated circuit devices the data should be transmitted). Accordingly, by employing the communication packet for communication between integrated circuits, inter-die communication in which large amounts of data may be transmitted quickly among integrated circuit devices is achieved.

Various refinements of the features noted above may be made in relation to various aspects of the present disclosure. Further features may also be incorporated in these various aspects as well. These refinements and additional features may be made individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Advantages of the disclosure may become apparent upon reading the following detailed description and upon reference to the drawings in which.

DETAILED DESCRIPTION OF SPECIFIC EMBODIMENTS

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

The highly flexible nature of programmable logic devices makes them an excellent fit for accelerating many computing tasks. Thus, programmable logic devices are increasingly used as accelerators for machine learning, video processing, voice recognition, image recognition, and many other highly specialized tasks, particularly those that would be too slow or inefficient in software running on a processor. Moreover, bitstreams that define a particular accelerator function may be programmed into a programmable logic device as requested, in a process known as partial reconfiguration. These portions of programmable logic device that are configured to perform accelerator functions may be referred to as function blocks and/or partial reconfiguration regions.

In some applications, tasks may be performed by several function blocks (e.g., partial reconfiguration regions) that may be disposed on more than one programmable logic device. For example, multiple programmable logic devices that operate together to perform a function or a series of functions may be included on a circuit board that enables communication between the programmable logic devices. For instance, a partial reconfiguration region on one programmable logic device may perform a first function and output data to a second partial reconfiguration region located on a second programmable logic device. In such a scenario, the amount of time spent to perform the first and second functions may be hampered by the amount of time it takes for data to be communicated between the programmable logic devices. In other words, the latency of communication between the programmable logic devices may affect the amount of time in which a sequence of processed occurs. Indeed, the data communicated from one partial reconfiguration region to another partial reconfiguration region may traverse several portions of one or more programmable logic devices, including programmable logic devices that are not the source or destination of the data. This routing scheme may cause the latency associated with the data to be undesirably high. Additionally, the bandwidth of a system to transmit data that employs multiple programmable logic devices may also be reduced due to high latency.

To increase the bandwidth of multiple programmable logic device systems and reduce the latency associated with communication between accelerators (e.g., function blocks and/or partial reconfiguration regions) of the programmable logic devices, this disclosure describes systems and methods that utilize networks-on-chips (NOCs) of programmable logic devices to enable data communication between the programmable logic devices. More particularly, and as described below, data transferred between multiple programmable logic devices may be routed through the programmable logic devices in a manner that utilizes the NOCs of the programmable logic devices, such that the data is communicated without passing through other programmable logic devices in the system. In other words, data may be transferred between partial reconfigurations regions of multiple programmable logic devices in an efficient manner that reduces the latency associated with data communication and enables increased bandwidth.

Indeed, as discussed below, various interconnection resources (e.g., input-outputs) associated with programmable logic devices may be utilized in conjunction with the NOCs of the programmable logic devices. For example, a communication packet associated with data being transferred may include an address (e.g., on another programmable logic device) to which the data should be transferred, and the communication packet may also include which nodes of NOCs should be utilized. Depending on the relationship between the programmable logic device from which the data is being transferred and the programmable logic device to which the data is being transferred (e.g., a location within a package or a circuit board), different interconnection resources may be used. Accordingly, data may be routed from a portion of a programmable logic device to a node of a NOC of the programmable logic device, to interconnection resource of the programmable logic device, to an interconnection node of the programmable logic device to which the data transferred, to a NOC of the programmable logic device that the data is transferred to, and finally to a target destination on the data-receiving programmable logic device.

Figure 1:
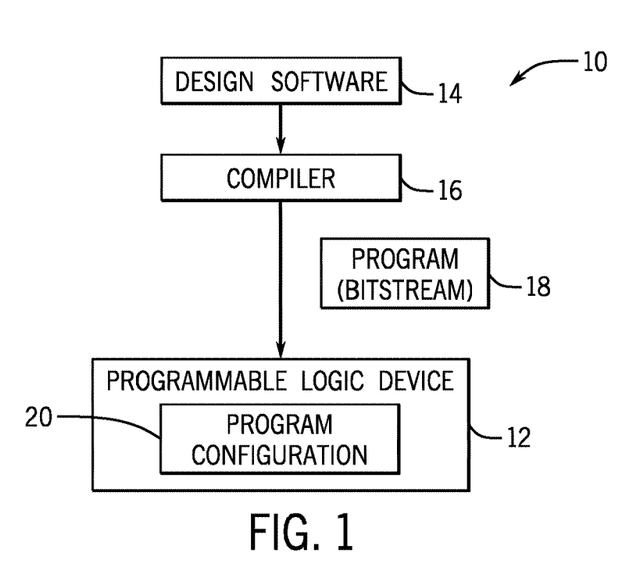
FIG. 1 is a block diagram of a programmable logic device that is programmed with a circuit design, in accordance with an embodiment of the present disclosure.

With this in mind, FIG. 1 illustrates a block diagram of a system 10 that may employ a reconfigurable programmable logic device 12 that has separate die for programmable logic fabric and fabric support circuitry. A designer may implement a circuit design functionality on an integrated circuit, such as a reconfigurable programmable logic device 12 (e.g., a field programmable gate array (FPGA)). The designer may implement a circuit design to be programmed onto the programmable logic device 12 using design software 14, such as a version of Intel® Quartus® by Intel Corporation of Santa Clara, Calif. The design software 14 may use a compiler 16 to generate a low-level circuit-design program (bitstream) 18, sometimes known as a program object file and/or configuration program, that programs the programmable logic device 12. Thus, the compiler 16 may provide machine-readable instructions representative of the circuit design to the programmable logic device 12. For example, the programmable logic device 12 may receive one or more programs (bitstreams) 18 that describe the hardware implementations that should be stored in the programmable logic device 12. A program (bitstream) 18 may be programmed into the programmable logic device 12 as a configuration program 20. The configuration program 20 may, in some cases, represent an accelerator function to perform for machine learning, video processing, voice recognition, image recognition, or other highly specialized task.

Figure 2:
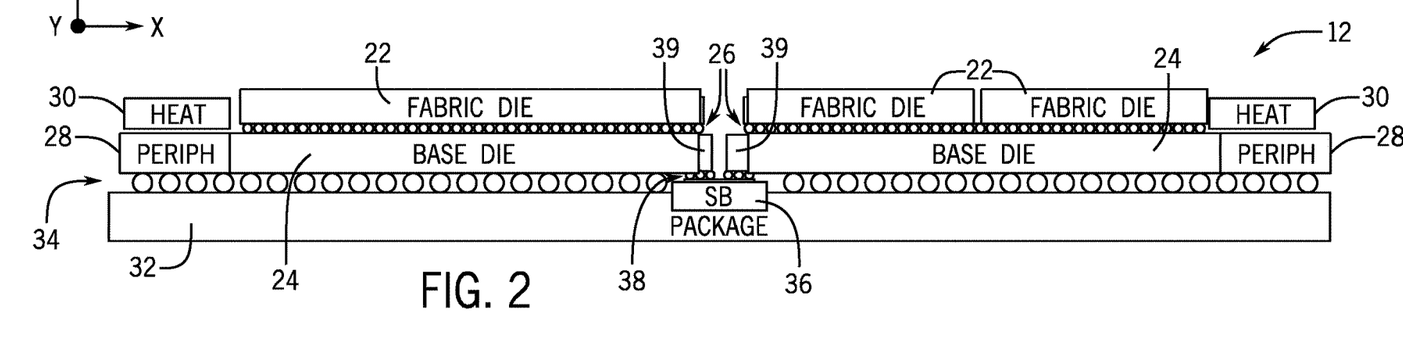
FIG. 2 is a block diagram of a package including the programmable logic device where a fabric die is vertically stacked with a base die, in accordance with an embodiment of the present disclosure.

The programmable logic device 12 may represent any integrated circuit device that includes a programmable logic device with two separate integrated circuit die where at least some of the programmable logic fabric is separated from at least some of the fabric support circuitry that operates the programmable logic fabric. One example of the programmable logic device 12 is shown in FIG. 2, but many others are described further below, and it should be understood that this disclosure is intended to encompass any suitable programmable logic device 12 where programmable logic fabric and fabric support circuitry are at least partially separated on different integrated circuit die. Indeed, in the example of FIG. 2, the programmable logic device 12 includes a fabric die 22 and a base die 24 that are connected to one another via microbumps 26. Although the fabric die 22 and base die 24 appear in a one-to-one relationship or a two-to-one relationship in FIG. 2, other relationships may be used. For example, a single base die 24 may attach to several fabric die 22, or several base die 24 may attach to a single fabric die 22, or several base die 24 may attach to several fabric die 22 (e.g., in an interleaved pattern along the x- and/or y-direction). Peripheral circuitry 28 may be attached to, embedded within, and/or disposed on top of the base die 24, and heat spreaders 30 may be used to reduce an accumulation of heat on the programmable logic device 12. The heat spreaders 30 may appear above, as pictured, and/or below the package (e.g., as a double-sided heat sink). The base die 24 may attach to a package substrate 32 via C4 bumps 34. In the example of FIG. 2, two pairs of fabric die 22 and base die 24 are shown communicatively connected to one another via a silicon bridge 36 (e.g., an embedded multi-die interconnect bridge (EMIB)) and microbumps 38 at a silicon bridge interface 39.

Figure 3:
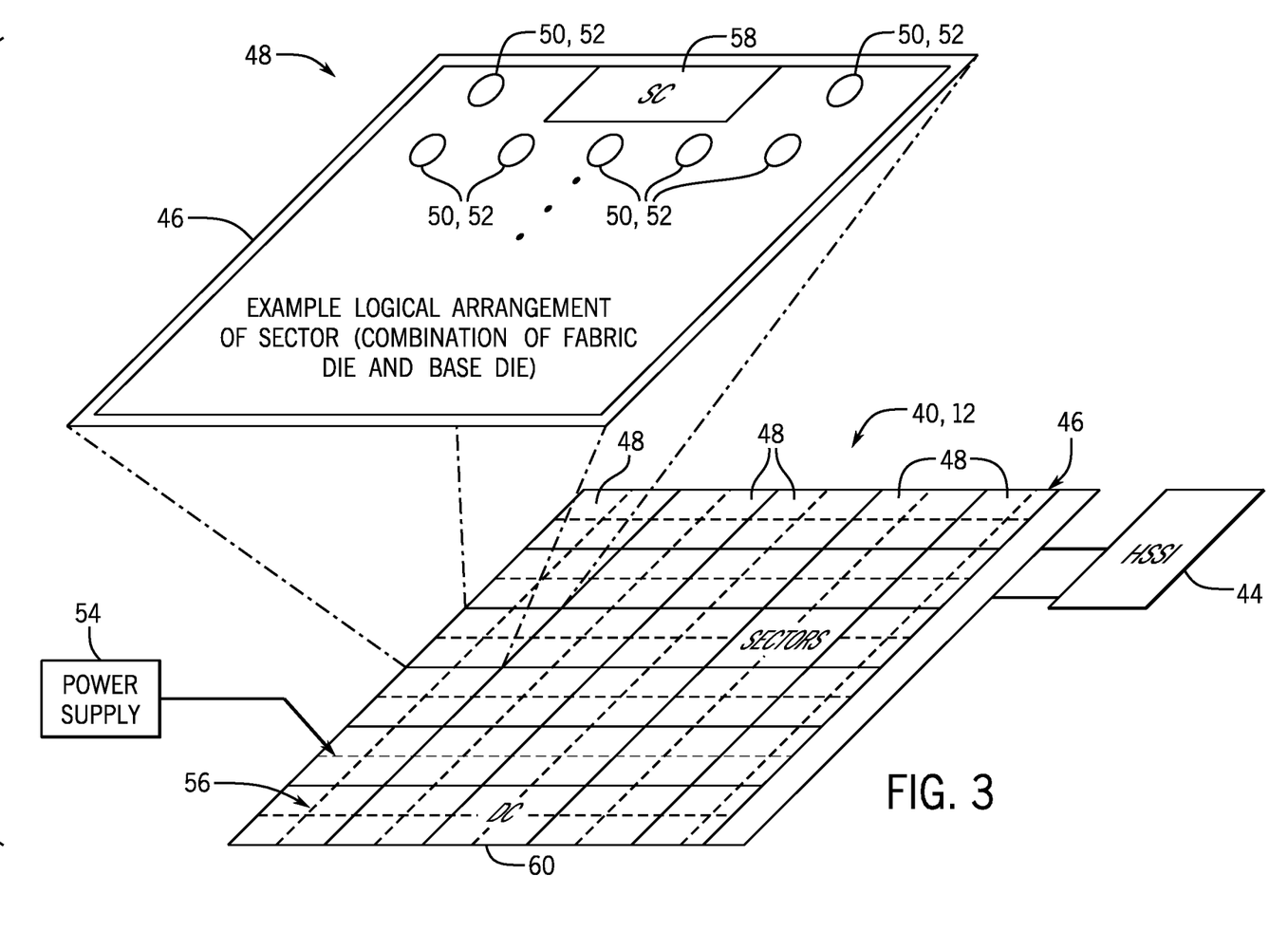
FIG. 3 is a block diagram of an example logical arrangement of the programmable logic device, in accordance with an embodiment of the present disclosure.

In combination, the fabric die 22 and base die 24 may operate as a programmable logic device such as a field programmable gate array (FPGA). For example, the fabric die 22 and the base die 24 may operate in combination as an FPGA 40, shown in FIG. 3. It should be understood that the FPGA 40 shown in FIG. 3 is meant to represent the type of circuitry and/or a logical arrangement of a programmable logic device when the both the fabric die 22 and the base die 24 operate in combination. In other words, some of the circuitry of the FPGA 40 shown in FIG. 3 may be found in the fabric die 22 and some of the circuitry of the FPGA 40 shown in FIG. 3 may be found in the base die 24. Moreover, for the purposes of this example, the FPGA 40 is referred to as an FPGA, though it should be understood that the device may be any suitable type of programmable logic device (e.g., an application-specific integrated circuit and/or application-specific standard product).

In the example of FIG. 3, the FPGA 40 may include transceiver circuitry (high-speed serial interface (HSSI)) 44 for driving signals off of the FPGA 40 and for receiving signals from other devices. The transceiver circuitry (HSSI) 44 may be part of the fabric die 22, the base die 24, or a separate die altogether. Interconnection resources 46 may be used to route signals, such as clock or data signals, through the FPGA 40. The FPGA 40 of FIG. 3 is shown to be sectorized, meaning that programmable logic resources may be distributed through a number of discrete programmable logic sectors 48. Each programmable logic sector 48 may include a number of programmable logic elements 50 having operations defined by configuration memory 52 (e.g., configuration random access memory (CRAM)). The programmable logic elements 50 may include combinational or sequential logic circuitry. For example, the programmable logic elements 50 may include look-up tables, registers, multiplexers, routing wires, and so forth. A designer may program the programmable logic elements 50 to perform a variety of desired functions. A power supply 54 may provide a source of voltage and current to a power distribution network (PDN) 56 that distributes electrical power to the various components of the FPGA 40. Operating the circuitry of the FPGA 40 causes power to be drawn from the power distribution network 56.

There may be any suitable number of programmable logic sectors 48 on the FPGA 40. Indeed, while 29 programmable logic sectors 48 are shown here, it should be appreciated that more or fewer may appear in an actual implementation (e.g., in some cases, on the order of 50, 100, or 1000 sectors or more). Each programmable logic sector 48 may include a sector controller (SC) 58 that controls the operation of the programmable logic sector 48. Each sector controller 58 may be in communication with a device controller (DC) 60. Each sector controller 58 may accept commands and data from the device controller 60, and may read data from and write data into its configuration memory 52 based on control signals from the device controller 60. In addition to these operations, the sector controller 58 and/or device controller 60 may be augmented with numerous additional capabilities. Such capabilities may include coordinating memory transactions between local fabric memory (e.g., local fabric memory or CRAM being used for data storage) and sector-aligned memory associated with that particular programmable logic sector 48, decrypting configuration programs (bitstreams) 18, and locally sequencing reads and writes to implement error detection and correction on the configuration memory 52 and sequencing test control signals to effect various test modes.

The sector controllers 58 and the device controller 60 may be implemented as state machines and/or processors. For example, each operation of the sector controllers 58 or the device controller 60 may be implemented as a separate routine in a memory containing a control program. This control program memory may be fixed in a read-only memory (ROM) or stored in a writable memory, such as random-access memory (RAM). The ROM may have a size larger than would be used to store only one copy of each routine. This may allow each routine to have multiple variants depending on "modes" the local controller may be placed into. When the control program memory is implemented as random access memory (RAM), the RAM may be written with new routines to implement new operations and functionality into the programmable logic sectors 48. This may provide usable extensibility in an efficient and easily understood way. This may be useful because new commands could bring about large amounts of local activity within the sector at the expense of only a small amount of communication between the device controller 60 and the sector controllers 58.

Each sector controller 58 thus may communicate with the device controller 60, which may coordinate the operations of the sector controllers 58 and convey commands initiated from outside the FPGA device 40. To support this communication, the interconnection resources 46 may act as a network between the device controller 60 and each sector controller 58. The interconnection resources may support a wide variety of signals between the device controller 60 and each sector controller 58. In one example, these signals may be transmitted as communication packets.

The FPGA 40 may be electrically programmed. With electrical programming arrangements, the programmable logic elements 50 may include one or more logic elements (wires, gates, registers, etc.). For example, during programming, configuration data is loaded into the configuration memory 52 using pins and input/output circuitry of the FPGA 40. In one example, the configuration memory 52 may be implemented as configuration random-access-memory (CRAM) cells. The use of configuration memory 52 based on RAM technology described herein is intended to be only one example. Moreover, configuration memory 52 may be distributed (e.g., as RAM cells) throughout the various programmable logic sectors 48 the FPGA 40. The configuration memory 52 may provide a corresponding static control output signal that controls the state of an associated programmable logic element 50 or programmable component of the interconnection resources 46. The output signals of the configuration memory 52 may be applied to the gates of metal-oxide-semiconductor (MOS) transistors that control the states of the programmable logic elements 50 or to programmable components of the interconnection resources 46.

Figure 4:
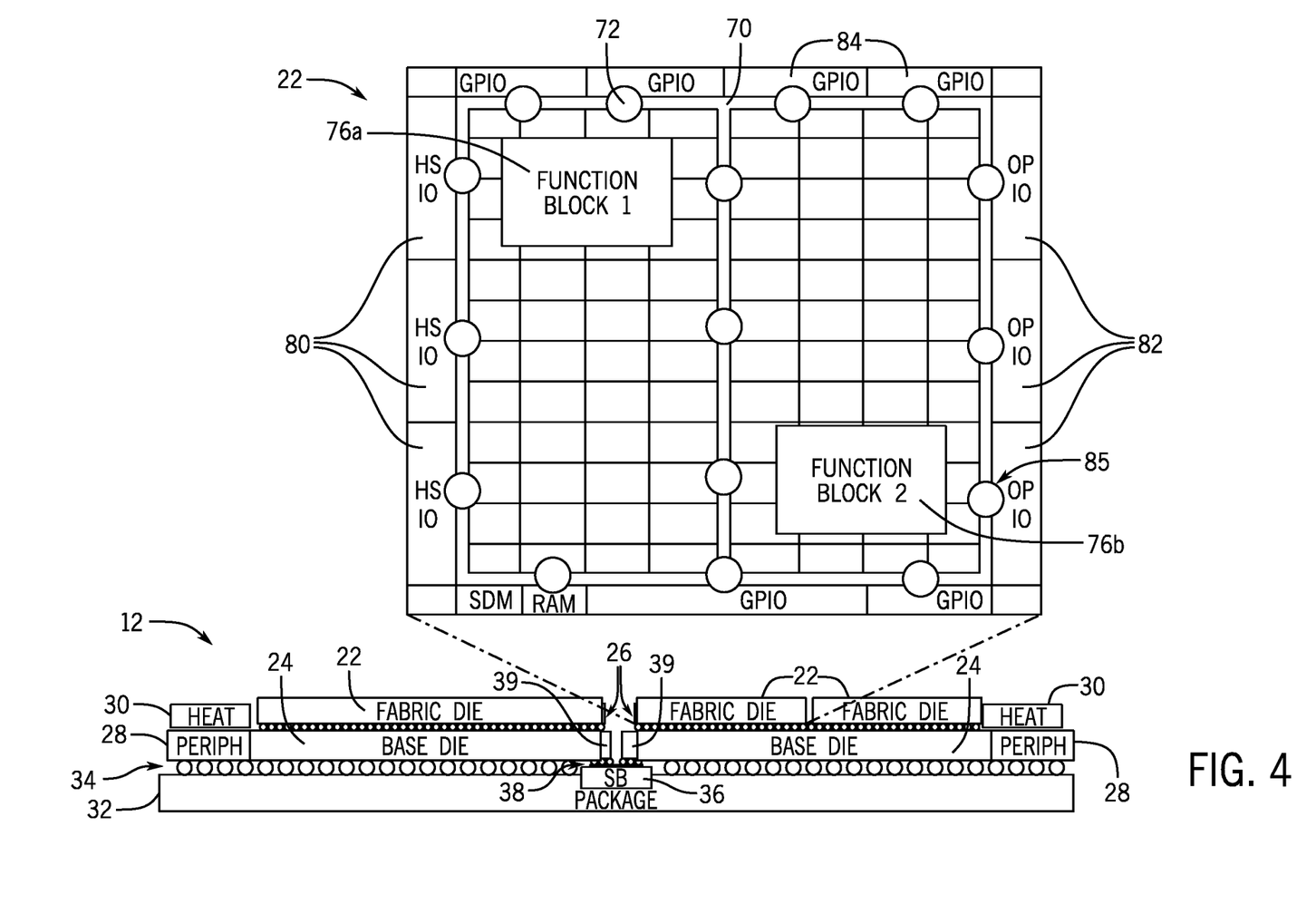
FIG. 4 is a block diagram of an example topology of the fabric die, in accordance with an embodiment of the present disclosure.

As stated above, the logical arrangement of the FPGA 40 shown in FIG. 3 may result from a combination of the fabric die 22 and base die 24. The circuitry of the fabric die 22 and base die 24 may be divided in any suitable manner. FIG. 4 illustrates a block diagram of an embodiment of the fabric die 22. As illustrated, the fabric die 22 includes a NOC 70 that enables intra-die and inter-die communication, for instance, via nodes 72, which may function as routers. Additionally, the fabric die 22 may include one or more function blocks 76, which may be partial reconfiguration regions of the programmable logic elements 50 of the programmable logic device 12 that may be modified (i.e., partially reconfigured) to implement new logic. The function blocks 76 may implement logic that performs a particular task, which may be user-defined. Moreover, FIG. 4 depicts various types of interconnection resources 46 that may be included in the fabric die 22. For instance, as illustrated, the interconnection resources 46 may include high-speed input-outputs (HSIOs) 80, on-package IOs (OPIOs) 82, and general purpose IOs (GPIOs) 84.

Data, such as communication packets, may be transferred between the function blocks 76 of the fabric die 22 and/or two or more fabric dies via the NOC 70 and/or the interconnection resources 46 (e.g., HSIOs 80, OPIOs 82, GPIOs 84). For instance, data may enter and exit the NOC 70 via one or more of the nodes 72 of the NOC 70. In some embodiments, the nodes 72 may include protocol translators 85, which may convert the data formats, data rates, and/or and protocols of the NOC 70 into those associated with the interconnection resources 46 or vice versa. In other words, the protocol translators 85 may convert protocols associated with the NOC 70 into protocols associated with the interconnection resources 46 and convert protocols associated with the interconnection resources 46 into protocols associated with the NOC 70. When data is transferred from one programmable logic device 12 to another, a protocol translator 85 may convert protocols associated with the NOC 70 into protocols associated with the interconnection resources 46, and a protocol translator 85 on the data-receiving programmable logic device may convert the protocols associated with the interconnection resources 46 into protocols associated with the NOC 70. Moreover, the protocol translators 85 may be specific to a particular type of interconnection resource 46 (e.g., a NOC to HSIO translator, NOC to OPIO translator, etc.). Furthermore, the protocol translators 85 may be implemented in several different ways. For example, as illustrated, the protocol translators 85 may be implemented as part of the nodes 72. For instance, the protocol translators 85 may be implemented as hard logic associated one or more of the nodes 72. That is, the protocol translators 85 may be included in a portion of the programmable logic device 12 that may not be reconfigurable by an end-user. As another example, in other embodiments, the protocol translators 85 may be implemented in soft logic (e.g., in a reconfigurable portion of the programmable logic device 12 such as a partial reconfiguration region).

Figure 5:
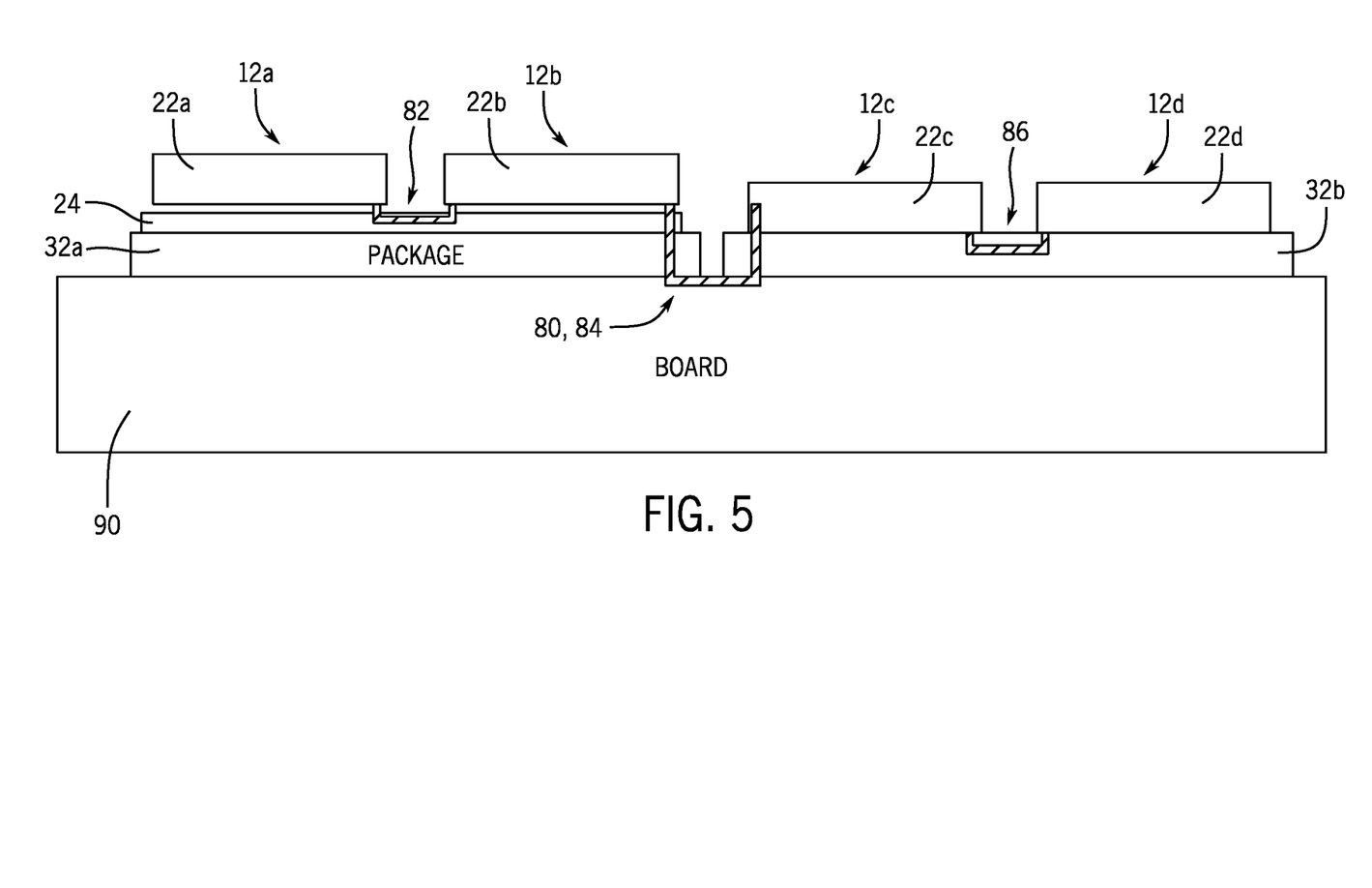
FIG. 5 is a block diagram of a hardware configuration that include several programmable logic devices, in accordance with an embodiment of the present disclosure.

As mentioned above, the programmable logic device 12 may include interconnection resources 46. The interconnection resources 46 may enable data to be transmitted and received by the programmable logic device 12. In some cases, data may be communicated between programmable logic devices 12 at least in part via a base die (e.g., base die 24), a package (e.g., package substrate 32), or a circuit board on which the programmable logic devices 12 are included. With this in mind, FIG. 5 provides a block diagram of a hardware configuration that includes several programmable logic devices 12. In particular, FIG. 5 illustrates how the various types of interconnection resources 46 may be implemented in a hardware configuration with the programmable logic devices 12.

As illustrated, fabric dies 22a and 22b are disposed on a base die 24, which may be an interposer. The fabric dies 22a and 22b and the base die 24 may be included on a package substrate 32a, which may be coupled to a circuit board 90, such as a printed circuit board. As additionally illustrated, the fabric dies 22c and 22d are disposed on a second package substrate 32b, which is also coupled to the circuit board 90.

The base die 24, packages 32a and 32b, and circuit board 90 may each enable communication via the various types of interconnection resources 46. For example, the base die 24 may enable communication between the fabric dies 22a and 22b to occur via OPIOs 82 of the fabric dies 22a and 22b. In other words, communication between the fabric dies 22a and 22b via OPIOs 82 may involve circuitry on the fabric die 22a, base die 24, and the fabric die 22b. As another example, data communication between the fabric dies 22c and 22d via EMIBIOs 86 may involve circuitry included on the fabric die 22c, package substrate 32b, and fabric die 22d. As yet another example, communication of data via HSIOs 80 and GPIOs 84 between fabric die 22b and fabric die 22c may involve circuitry on the fabric die 22b, base die 24, package substrate 32a, circuit board 90, package substrate 32b, and fabric die 12c.

Before proceeding to discuss inter-die communication in greater detail, it should be noted that the hardware configuration provided in FIG. 5 is one example of a hardware implementation that may be used. In other embodiments, other hardware implementations may be implemented. For example, in other embodiments, more or fewer than four fabric dies 22 may be included, and any suitable number of programmable logic devices 12 may be utilized.

Figure 6:
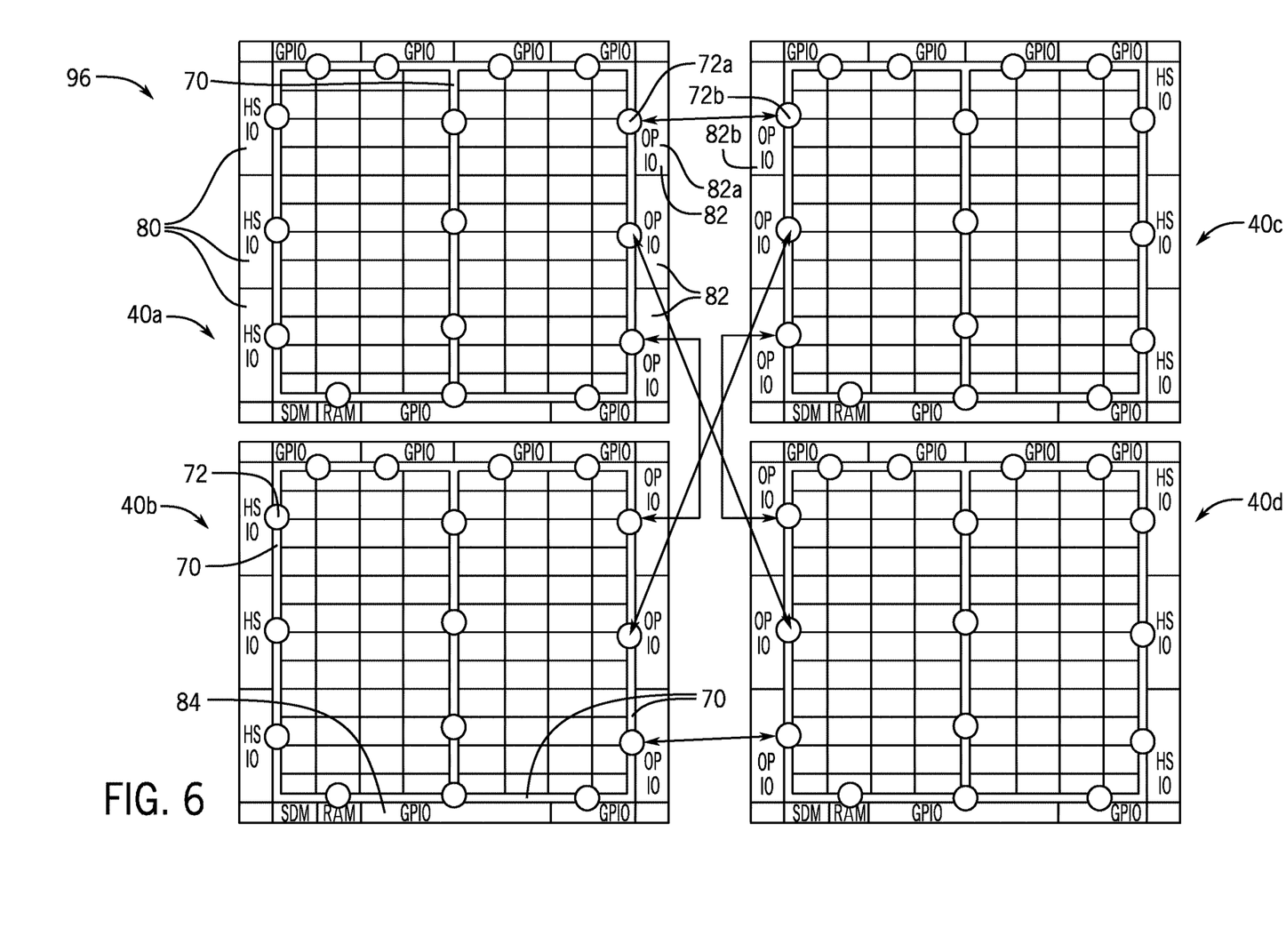
FIG. 6 is a block diagram of a system that includes several field programmable gate arrays (FPGAs) that may communicate with one another, in accordance with an embodiment of the present disclosure.

Continuing with the drawings, FIG. 6 is a block diagram of a system 96 that includes several FPGAs 40 that may communicate with one another. In other words, FIG. 6 provides an example of FPGAs 40 that may partake in inter-die communication in accordance with the embodiments described herein. For instance, the FPGAs 40 may share a circuit board 90. While the illustrated embodiment includes the FPGAs 40, in other embodiments, other programmable logic devices may be utilized. Additionally, while the illustrated embodiment includes four FPGAs 40, in other embodiments, more or fewer than four FPGAs 40 may be included. For example, any suitable number of programmable logic devices up to a maximum number of programmable logic devices supported by a utilized hardware implementation may be used.

Inter-die communication may occur via nodes 72 of NOCs 70 of the FPGAs 40 as well as the interconnection resources 46 of the FPGAs 40. For instance, in the illustrated embodiment, inter-die communication may occur via nodes 72 associated with OPIOs 82 of the FPGAs 40. As such, communication between one of the FPGAs 40 and another of the FPGAs 40 may be associated with particular nodes 72 and OPIOs 82 of the FPGAs 40. For example, a first FPGA 40a may communicate with a second FPGA 40b via node 72a and OPIO 82a of the first FPGA 40a and OPIO 82b and node 72b of the second FPGA 40b.

More specifically, a communication packet associated with data to be transferred may be utilized to describe from where the data originates (e.g., a function block 76 on an FPGA 40), to where the data should be sent (e.g., a function block of another FPGA 40), and through which nodes 72 the data should pass. For example, as discussed below, each function block 76, which may be associated with a virtual function identifier (e.g., an identifier associated with a function associated with the function block 76 that may be utilized by a virtual machine) of a programmable logic device may be associated with a unique virtual function and a unique identifier associated with the location of the function block 76 on an FPGA 40. These identifiers may be included in the communication packet or associated with the communication packet. Based on the communication packet, a node 72 of an FPGA 40 may transfer data via its NOC 70 to a node 72 defined by the communication packet, and the node 72 may route the data to a node 72 of another FPGA 40. In some embodiments, the communication packet may be transmitted prior to the data associated with the communication packet. However, in other embodiments, the data being transferred between nodes 72 may be included in a communication packet.

Figure 7:
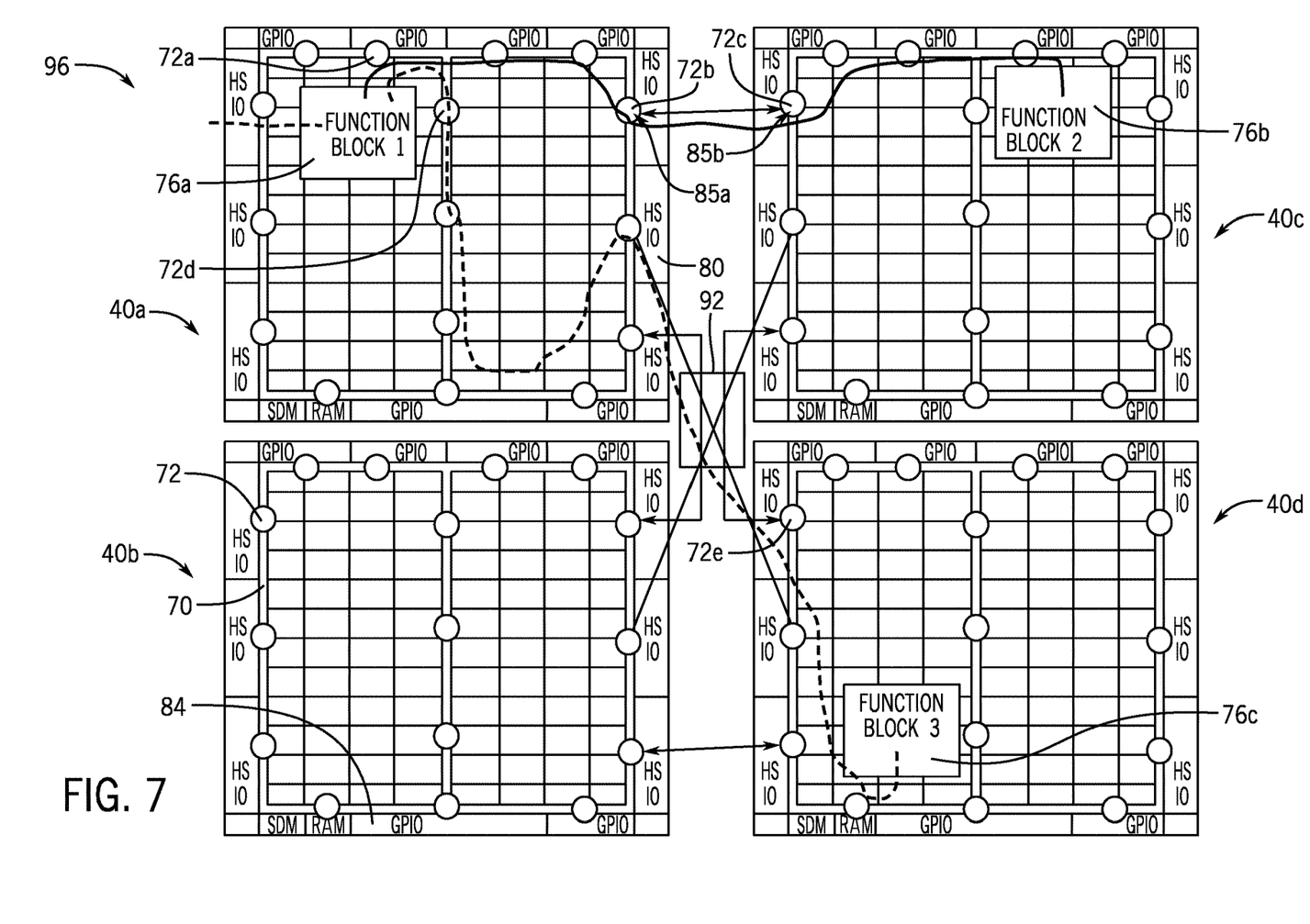
FIG. 7 is a block diagram of the system of FIG. 6 in which FPGAs of the system are performing inter-die communication, in accordance with an embodiment of the present disclosure.

Continuing with the discussion of inter-die communication, FIG. 7 is a block diagram of the system 96 in which several FPGAs 40 are performing inter-die communication. In the illustrated embodiment, inter-die communication occurs via HSIOs 80, but it is be understood that other types of interconnection resources 46 may be utilized. In particular, FIG. 7 illustrates a first FPGA 40*a* that is associated with a first function block 76*a*. As shown, data may be processed by the first function block 76*a*, and the processed data may be transferred to a second function block 76*b* of a second FPGA 40*c* or a third function block 76*c* of a third FPGA 40*d*.

In the illustrated embodiment, inter-die communication may occur in more than one manner. For example, data may be transferred from the first function block 76*a* to the second function block 76*b* on a second FPGA 40*b* with the aid of one or more protocol translators 85 (e.g., one or more NOC to HSIO translators). For instance, a communication packet may be generated for data to be transferred to some destination. As noted above, the communication packet may provide an address (e.g., an address associated with the second function block 76*b*) as well as an indication regarding routing the data (e.g., via which nodes 72 of the NOCs 70 of the FPGAs 40*a* and 40*b* the data is to be transferred). Accordingly, the data may enter the NOC 70 via the node 72*a*, which may route the data to a second node 72*b* associated with HSIO 80 utilized to communicate with the second FPGA 40*c*. A protocol translator 85*a* may convert protocols associated with the NOC 70 into protocols associated with the HSIO 80, and the data may be transferred via the HSIO 80 to a node 72*c* of the second FPGA 40*c*, which may include a protocol translator 85*b* that may convert the protocols associated with the HSIO 80 into protocols associated with the NOC 70 of the second FPGA 40*c*. Additionally, the node 72*c* may route the data to the second function block 76*b* based on the routing information provided by the communication packet.

As described above, nodes 72 may send data to other nodes 72 (e.g., of the same programmable logic device 12 or of a different programmable logic device 12), and the nodes 72 may receive data from other nodes 72. In particular, the transmission and reception of data may be performed by node controllers that may be included in the nodes 72 or associated with the nodes 72. For example, the node controllers may generate and/or receive a communication packet associated with data to be transferred or received, and the node controller may route the data to a node 72 or function block 76 as indicated by the communication packet.

As another example of inter-die communication, a central router 92 may be utilized to facilitate communication of data between FPGAs. The central router 92 may be implemented on an integrated circuit device that is communicatively coupled to the FPGAs 40 or by one of the FPGAs 40. For instance, the central router 92 may be implemented on an integrated circuit device that is included on the same package (e.g., package substrate 32) or circuit board 90 as the FPGAs 40. As illustrated, a node 72*d* may receive data from the first function block 76*a*, send the data to the central router 92, and the central router 92 may route the data to a destination node 72 of the FPGA 40. For instance, in the illustrated embodiment, the data may be sent to a node 72*e* of the third FPGA 40*d* via the central router 92. Accordingly, the central router 92 may receive data and an associated communication packet and, based on the communication packet, route the data from the first function block 76*a* to the third function block 76*c*.

As described above, data may be processed across multiple programmable logic devices 12. For instance, data may be processed by a function block 76 of a programmable logic device 12 before being transferred via a node 72 of a NOC 70 of the programmable logic device 12 to another programmable logic device 12, which may include a function block 76 to which the data is ultimately transferred for further processing. Data may be transferred and processed a number of times by several different function blocks 76 located on several programmable logic devices 12.

Figure 8:
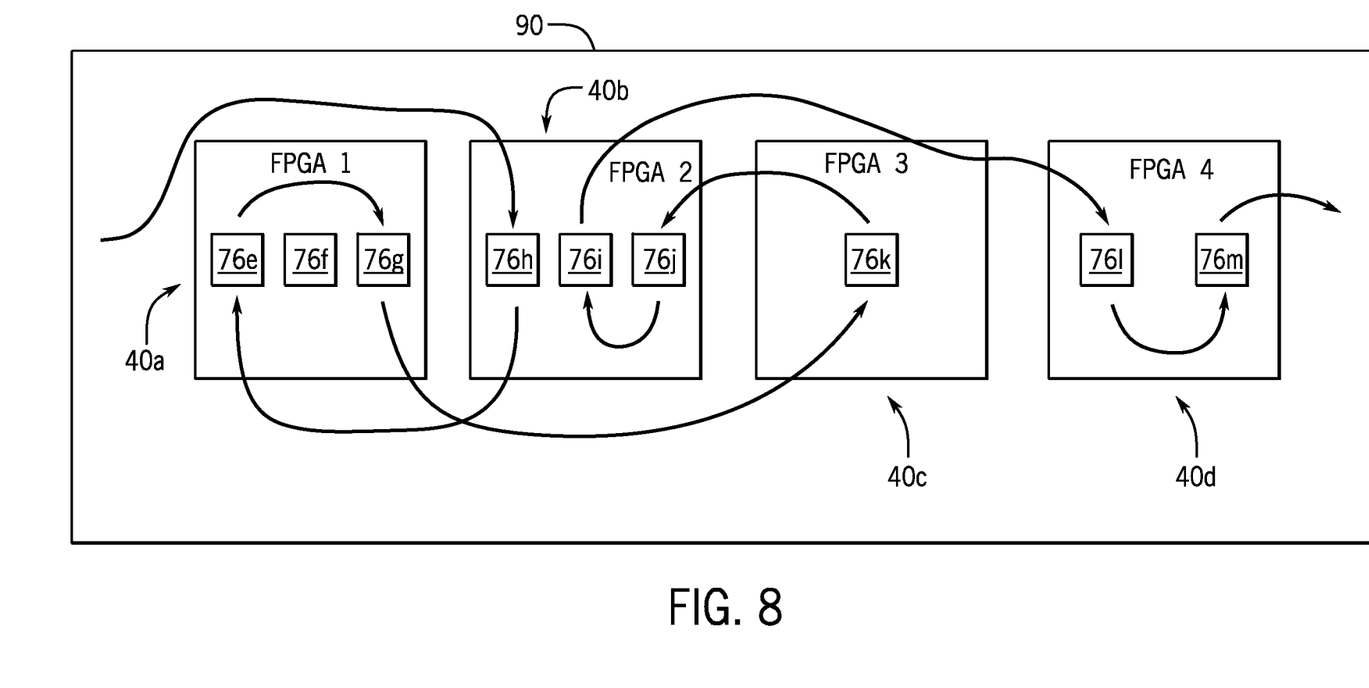
FIG. 8 is a block diagram illustrating inter-die communication across function blocks of several FPGAs, in accordance with an embodiment of the present disclosure.

Keeping this in mind, FIG. 8 is a block diagram illustrating inter-die communication across function blocks 76 of several FPGAs 40. More specifically, FIG. 7 includes four FPGAs 40, each of which includes at least one function block 76. As illustrated, data may pass from a function block 76 of one FPGA 40 to another function block 76 of another FPGA 40. Additionally, data coming to the FPGAs 40 be sent directly to a specific FPGA 40, such as a second FPGA 40*b*, and routed onwards using semaphores, which can be used to control the communication between function blocks 76 of multiple FPGAs 40. In other words, data may be sent to and from function blocks 76 of the FPGAs 40 in a particular order by using a semaphore system and NOCs 70 of the FPGAs 40. More specifically, the semaphore system may be implemented via software that may be executed via an integrated circuit associated with the FPGAs 40 and/or controllers associated with the FPGAs 40 (e.g., controllers associated with the nodes 72). The semaphore system may provide a mechanism that enables the data to be passed from one process (e.g., associated with one function block 76) to another process (e.g., a process associated with a different function block 76).

For instance, in the illustrated example, a first FPGA 40*a* includes function blocks 76*e*, 76*f*, and 76*g*, a second FPGA 40*b* includes function blocks 76*h*, 76*i*, and 76*j*, a third FPGA 40*c* includes function block 76*k*, and a fourth FPGA 40*d* includes function blocks 76*l* and 76*m*. As illustrated, data may first be received by the function block 76*h*, which may process the data and send the processed data to function block 76*e*, which, in turn, may process the data and send the processed data to function block 76*g*. Successive function blocks 76 may receive data from functions blocks 76, process the data, and send the data to other function blocks 76 until the data is processed by the last function block (e.g., function block 76*m*), at which point the data may be sent elsewhere. The order of the function blocks 76 may be designated using a string of virtual functions.

For example, each of the function blocks 76 may be associated with a unique virtual function identifier (VFID) as well as a unique identifier indicative of a location on an FPGA 40 (FPGA_ID), such as function block 76 or a programmable logic sector 48 or the FPGA 40. Each virtual function may be associated with a physical function that is performed by a function block 76. As such, each VFID may correspond to an FPGA_ID. Accordingly, a string of virtual functions may correspond to an order of locations on the FPGAs 40 in which data should be transferred. For instance, in the illustrated embodiment, a string of virtual functions may include a virtual function associated with function block 76*h* (e.g., VFID_1) followed by a virtual function associated with function block 76*e* (e.g., VFID_2). Locations on the FPGAs 40*b* and 40*a* corresponding to the function blocks 76*h* and 76*e* may be associated with identifiers (e.g., FPGA_ID_1 and FPGA_ID_2, respectively), which, in turn, may be associated with the virtual function identifiers. In other words, VFID_1 and FPGA_ID_1 may be associated with one another, and VFID_2 and FPGA_ID_2 may be associated with one another. Accordingly, data may be sent to, and processed by, the function blocks 76 in the order called for by the string of virtual functions utilizing the NOCs 70 of the FPGAs 40. In other words, instead of having the data pass though many programmable logic sectors 48 of an FPGA 40 until the data reaches the desired destination (e.g., a function block 76 on another one of the FPGAs 40), using the presently disclosed techniques, the data may be routed to a particular portion of a particular FPGA 40 more rapidly by utilizing the NOCs of the FPGA 40 and the inter-die communication techniques discussed above.

Additionally, a portion of the FPGA 40 may provide registers that may be utilized to store data generally associated with data that is transmitted. For example, a data input register may store information regarding a location or source in which data originates (e.g., a function block 76 from which data will be sent), the amount of data to be sent, and other characteristics associated with the data to be sent. As another example, the registers may include a control register that may include data related to a status of the data. For instance, among other things, the control register may denote whether data is being transferred or being processed by a function block 76. More specifically, as a status of the data changes, the control register may be updated to reflect the change in the status of the data. Continuing with examples of registers that may be included, there may also be data output registers, which may include data indicative of a destination that corresponds to where data is to be sent (e.g., a function block 76). Another register that may be utilized may be capabilities registers, which may each reflect a function that a function block 76 may perform (e.g., a function associated with a function block 76). As yet another example, the registers may include error handling registers, which may store information regarding interruptions, errors, or error management associated with function blocks 76 or the FPGAs 40.

As data is transferred to or from a function block 76 and/or processed by a function block 76, one or more of the registers may be updated. A semaphore system executed via an integrated circuit or node controller and associated with a string of virtual functions may transfer the data as called for based on the registers. For example, as a register indicates that data has been processed by a function block 76, the semaphore system may be utilized to transfer the data to the function block 76 associated with the next virtual function indicated by the string of virtual functions. In other words, an FPGA_ID associated with the VFID associated with the subsequent virtual function may be determined, a pathway (e.g., via NOCs 70 and interconnection resources 46) to the function block 76 associated with the FPGA_ID may be determined, a communication packet may be generated, and the data may be transferred to the function block 76. Accordingly, data may be routed from one function block 76 to another function block 76 associated with another programmable logic device 12 on a particular path (e.g., defined by the communication packet) via NOCs 70 of multiple programmable logic devices 12, and the data may be transferred as soon as it has been processed. As such, the presently disclosed techniques enable high bandwidth and low latency communication between multiple programmable logic devices.

The programmable logic device 12 may be, or may be a component of, a data processing system. For example, the programmable logic device 12 may be a component of a data processing system 100, shown in FIG. 9. The data processing system 100 includes a host processor 102, memory and/or storage circuitry 104, and a network interface 106. The data processing system 100 may include more or fewer components (e.g., electronic display, user interface structures, application specific integrated circuits (ASICs)). The host processor 102 may include any suitable processor, such as an Intel® Xeon® processor or a reduced-instruction processor (e.g., a reduced instruction set computer (RISC), an Advanced RISC Machine (ARM) processor) that may manage a data processing request for the data processing system 100 (e.g., to perform machine learning, video processing, voice recognition, image recognition, data compression, database search ranking, bioinformatics, network security pattern identification, spatial navigation, or the like). The memory and/or storage circuitry 104 may include random access memory (RAM), read-only memory (ROM), one or more hard drives, flash memory, or the like. The memory and/or storage circuitry 104 may be considered external memory to the programmable logic device 12 and may hold data to be processed by the data processing system 100. In some cases, the memory and/or storage circuitry 104 may also store configuration programs (bitstreams) for programming the programmable logic device 12. The network interface 106 may allow the data processing system 100 to communicate with other electronic devices. The data processing system 100 may include several different packages or may be contained within a single package on a single package substrate.

Figure 9:
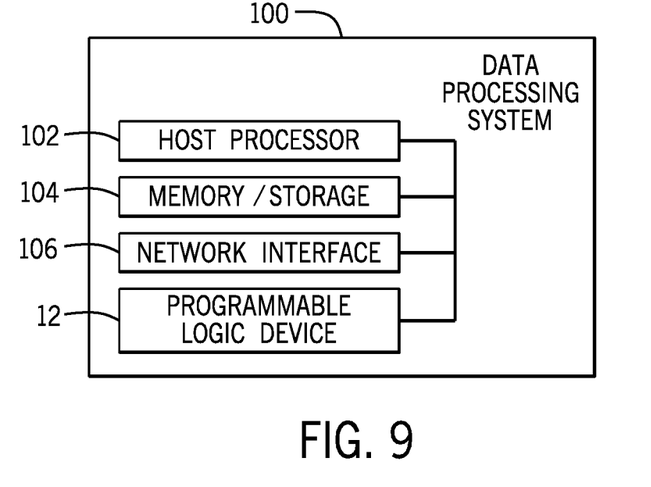
FIG. 9 is a block diagram of a data processing system that includes a programmable logic device, in accordance with an embodiment of the present disclosure.

In one example, the data processing system 100 may be part of a data center that processes a variety of different requests. For instance, the data processing system 100 may receive a data processing request via the network interface 106 to perform machine learning, video processing, voice recognition, image recognition, data compression, database search ranking, bioinformatics, network security pattern identification, spatial navigation, or some other specialized task. The host processor 102 may cause the programmable logic fabric of the programmable logic device 12 to be programmed with a particular accelerator related to requested task. For instance, the host processor 102 may instruct that configuration data (bitstream) stored on the memory/storage 364 or cached in sector-aligned memory of the programmable logic device 12 to be programmed into the programmable logic fabric of the programmable logic device 12. The configuration data (bitstream) may represent a circuit design for a particular accelerator function relevant to the requested task. Due to the high density of the programmable logic fabric, the proximity of the substantial amount of sector-aligned memory to the programmable logic fabric, or other features of the programmable logic device 12 that are described here, the programmable logic device 12 may rapidly assist the data processing system 260 in performing the requested task. Indeed, in one example, an accelerator may assist with a voice recognition task less than a few milliseconds (e.g., on the order of microseconds) by rapidly accessing and processing large amounts of data in the accelerator using sector-aligned memory.

The methods and devices of this disclosure may be incorporated into any suitable circuit. For example, the methods and devices may be incorporated into numerous types of devices such as microprocessors or other integrated circuits. Exemplary integrated circuits include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), and microprocessors, just to name a few.

Moreover, while the method operations have been described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of overlying operations is performed as desired.

The embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

Example Embodiments of the Disclosure

The following numbered clauses define certain example embodiments of the present disclosure.

CLAUSE 1.
An integrated circuit device, comprising:
a first network on chip (NOC) circuit configured to:
receive a first set of data; and
transfer the first set of data to a first node of the first NOC circuit, wherein the first node is configured to transfer the first set of data to a second NOC circuit of an additional integrated circuit device separate from the integrated circuit device.

CLAUSE 2.
The integrated circuit device of clause 1, wherein a portion of the integrated circuit device is associated with a function block configured to process the first set of data.

CLAUSE 3.
The integrated circuit device of clause 1, wherein first set of data is associated with a communication packet comprising a first location indicative of a first portion of the integrated circuit device and a second location indicative of a second portion of the additional integrated circuit device.

CLAUSE 4.
The integrated circuit device of clause 3, wherein the second portion of the additional integrated circuit device is associated with a function block configured to process the first set of data after being processed by the integrated circuit device.

CLAUSE 5.
The integrated circuit device of clause 3, wherein the communication packet comprises data regarding a plurality of nodes associated with the first NOC circuit and the second NOC circuit that the first set of data is routed through.

CLAUSE 6.
The integrated circuit device of clause 1, wherein the first node is associated with an input/output port of the integrated circuit device.

CLAUSE 7.
The integrated circuit device of clause 6, wherein the first node comprises a protocol translator configured to translate a first protocol associated with the first NOC circuit into a second protocol associated with the input/output port.

CLAUSE 8.
The integrated circuit device of clause 1, wherein the integrated circuit device comprises a field programmable gate array (FPGA).

CLAUSE 9.
A system for transferring data between programmable logic devices, comprising:
a first programmable logic device, comprising:
a first portion associated with a first function block configured to process a first set of data; and
first network on chip (NOC) circuitry configured to receive the first set of data and transfer the first set of data to a first node of the first NOC circuitry; and
a second programmable logic device, comprising:
second NOC circuitry configured to:
receive the first set of data via the first node and a second node of the second NOC circuitry; and
transfer the first set of data to a second portion of the second programmable logic device associated with a second function block.

CLAUSE 10.
The system of clause 9, wherein the first function block is configured to process the first set of data according to a string of virtual functions that defines an order in which the first set of data is to be processed, wherein the string of virtual functions comprises a first virtual function identifier associated with the first function block and a second virtual function identifier associated with the second function block.

CLAUSE 11.
The system of clause 10, wherein the first virtual function identifier is associated with a first identifier indicative of a first location of the first function block on the first programmable logic device.

CLAUSE 12.
The system of clause 9, comprising a central router configured to receive the first set of data from the first programmable logic device and transfer the first set of data to the second programmable logic device.

CLAUSE 13.

The system of clause 9, comprising a third programmable logic device comprising:
  a third portion associated with a third function block configured to process the first set of data; and
  third NOC circuitry comprising a third node configured to receive the first set of data and transfer the first set of data to the third function block.

CLAUSE 14.

The system of clause 13, wherein the third node is configured to receive the first set of data from the second programmable logic device after the second function block has operated on the first set of data.

CLAUSE 15.

The system of clause 9, wherein the first function block is configured to implement a protocol translator via soft logic.

CLAUSE 16.

A system for transferring data between programmable logic devices, comprising:
  a plurality of programmable logic devices, wherein each of the programmable logic devices comprises:
    at least one accelerator configured to process a set of data; and
    network on chip (NOC) circuitry configured to receive the set of data from the at least one accelerator and at least one other programmable logic device of the plurality of programmable logic devices.

CLAUSE 17.

The system of clause 16, comprising a package substrate, wherein each of the plurality of programmable logic devices is disposed on the package substrate.

CLAUSE 18.

The system of clause 16, wherein the plurality of programmable logic devices comprises a first programmable logic device comprising a first accelerator and first NOC circuitry, wherein the first NOC circuitry comprises a first node and a second node, wherein the first node is configured to receive the set of data from the first accelerator and transfer the set of data to the second node at least partially via the first NOC circuitry, wherein the second node is configured to cause the data to be transferred to a second programmable logic device of the plurality of programmable logic devices.

CLAUSE 19.

The system of clause 18, wherein second node is associated with a high-speed input-output (HSIO), an on-package input/output (OPIO), a general purpose input/output (GPIO), or an embedded multi-die interconnect bridge input/output (EMIBIO).

CLAUSE 20.

The system of clause 16, wherein the NOC circuitry is disposed on a fabric die associated with each of the plurality of programmable logic devices.

What is claimed is:

1. An integrated circuit device, comprising:
  a first network on chip (NOC) circuit configurable to:
    receive a set of data; and
    transfer the set of data to a first node of the first NOC circuit, wherein the first node is configured to directly transfer the set of data to a second node of a second NOC circuit of an additional integrated circuit device separate from the integrated circuit device, and wherein the first node comprises a first protocol translator configurable to translate a first protocol associated with the first NOC circuit into a second protocol associated with an interconnection resource of a plurality of interconnection resources configurable for off-die communication; and
  the second NOC circuit configurable to:
    receive the set of data from the second node, wherein the second node is associated with the interconnection resource of the plurality of interconnection resources, and wherein the second node comprises a second protocol translator configurable to translate the second protocol associated with the interconnection resource into a third protocol associated with the second NOC circuit.

2. The integrated circuit device of claim 1, wherein a portion of the integrated circuit device is associated with a first portion of programmable logic circuitry configurable to process the set of data.

3. The integrated circuit device of claim 1, wherein the set of data is associated with a communication packet comprising a first location indicative of a first portion of the integrated circuit device and a second location indicative of a second portion of the additional integrated circuit device.

4. The integrated circuit device of claim 3, wherein the second portion of the additional integrated circuit device is associated with a first portion of programmable logic circuitry configurable to process the set of data after being processed by the integrated circuit device.

5. The integrated circuit device of claim 3, wherein the communication packet comprises data regarding a plurality of nodes associated with the first NOC circuit and the second NOC circuit that the set of data is routed through.

6. The integrated circuit device of claim 1, wherein the second node is associated with an input/output port of the second NOC circuit.

7. The integrated circuit device of claim 6, wherein the second protocol translator of the second node is configurable to translate the first protocol associated with the input/output port into the second protocol associated with the second NOC circuit.

8. A system for transferring data between programmable logic devices, comprising:
  a first programmable logic device, comprising:
    a first portion associated with a first portion of programmable logic circuitry configurable to process a set of data; and
    first network on chip (NOC) circuitry configurable to:
      receive a communication packet and the set of data, wherein the communication packet comprises a string of virtual functions defining an order in which the set of data is to be processed, wherein the string of virtual functions comprises a first virtual function identifier associated with the first portion of programmable logic circuitry, a second virtual function identifier associated with a second portion of programmable logic circuitry, and one or more nodes between the first portion of programmable logic circuitry and the second portion of programmable logic circuitry; and
      transfer the set of data to a first node of the first NOC circuitry based at least in part on the communication packet; and
  a second programmable logic device comprising:
    second NOC circuitry configurable to:
      receive the communication packet and the set of data via a second node; and
      transfer the set of data from second node associated with a second portion of the second programmable logic device to a second portion of programmable logic circuitry based in part on the communication packet.

9. The system of claim 8, comprising a central router configurable to transfer the set of data between the first programmable logic device, the second programmable logic device based at least in part on the communication packet, wherein the central router is separate from and located between the first programmable logic device and the second programmable logic device.

10. The system of claim 8, wherein the first virtual function identifier is associated with a first identifier indicative of a first location of the first portion of programmable logic circuitry on the first programmable logic device.

11. The system of claim 9, comprising:
a third programmable logic device, comprising:
third NOC circuitry configured to receive the set of data via the central router and a third node, and
a fourth programmable logic device comprising:
a fourth portion associated with a fourth portion of programmable logic circuitry configurable to process the set of data; and
fourth NOC circuitry configured to receive the set of data via the central router and a fourth node and transfer the set of data to the fourth portion of programmable logic circuitry.

12. The system of claim 8, wherein the first node comprises a protocol translator configurable to translate a first protocol associated with the first NOC circuitry into a second protocol associated with a first interconnection resource of a plurality of interconnection resources configurable for off-die communication, and wherein the second node comprises a second protocol translator configurable to translate the second protocol associated with a second interconnection resource of the plurality of interconnection resources into a third protocol associated with the second NOC circuitry.

13. A system for transferring data between programmable logic devices, comprising:
a plurality of programmable logic devices on different respective dies, wherein respective programmable logic devices of the plurality of programmable logic devices comprise:
at least one accelerator that is configurable to process a set of data, wherein the at least one accelerator is associated with a virtual function identifier and a unique identifier;
one or more nodes configurable to:
receive a communication packet comprising a string of virtual functions defining an order in which the set of data is to be processed, wherein the string of virtual functions comprises one or more virtual function identifiers and one or more unique identifiers; and
transmit the data to the at least one accelerator of a different one of the plurality of programmable logic devices based on the string of virtual functions; and a semaphore system comprising:
a register configurable to be updated in response to the at least one accelerator processing the set of data.

14. The system of claim 13, wherein the plurality of programmable logic devices comprises a first programmable logic device comprising a first accelerator and first NOC circuitry, wherein the first NOC circuitry comprises a first node of the one or more nodes and a second node of the one or more nodes, wherein the first node is configurable to receive the set of data from the first accelerator and transfer the set of data to the second node at least partially via the first NOC circuitry, wherein the second node is configurable to cause the set of data to be transferred to a second programmable logic device of the plurality of programmable logic devices.

15. The system of claim 14, wherein the second node is associated with a high-speed input-output (HSIO), an on-package input/output (OPIO), a general purpose input/output (GPIO), or an embedded multi-die interconnect bridge input/output (EMIBIO).

16. The integrated circuit device of claim 1, wherein the second node is associated with the plurality of interconnection resources and configurable to receive the second protocol, wherein the plurality of interconnection resources comprises a high-speed input-output (HSIO), an on-package input/output (OPIO), a general purpose input/output (GPIO), or an embedded multi-die interconnect bridge input/output (EMIBIO).

17. The integrated circuit device of claim 1, wherein the first protocol translator of the first node is configurable to translate the second protocol associated with the plurality of interconnection resources into a fourth protocol associated with a third NOC circuit.

18. The system of claim 13, wherein the semaphore system comprises a second register configurable to be updated when the set of data is transferred by the at least one accelerator, a third register configurable to reflect a function of the at least one accelerator, and a fourth register configurable to store errors of the at least one accelerator.

19. The system of claim 13, wherein the one or more nodes is associated with high-speed input-output (HSIO), an on-package input/output (OPIO), a general purpose input/output (GPIO), or an embedded multi-die interconnect bridge input/output (EMIBIO), or a combination thereof.

20. The system of claim 13, wherein the unique identifier is associated with a programmable logic device identifier, wherein the programmable logic device identifier defines on which of the plurality of programmable logic devices the at least one accelerator of the different one of the plurality of programmable logic devices is located, and wherein the virtual function identifier is associated a physical function performed by the at least one accelerator.

* * * * *